(12) United States Patent
Briard et al.

(10) Patent No.: US 12,530,826 B2
(45) Date of Patent: Jan. 20, 2026

(54) CORRECTION OF ARTIFACTS OF TOMOGRAPHIC RECONSTRUCTIONS BY NEURON NETWORKS

(71) Applicant: COMMISSARIAT A L'ENERGIE ATOMIQUE ET AUX ENERGIES ALTERNATIVES, Paris (FR)

(72) Inventors: Mateo Briard, Grenoble (FR); Cedric Allier, Grenoble (FR); William Pierre, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 432 days.

(21) Appl. No.: 18/146,637

(22) Filed: Dec. 27, 2022

(65) Prior Publication Data

US 2023/0222710 A1    Jul. 13, 2023

(30) Foreign Application Priority Data

Dec. 28, 2021  (FR) ..................... 21 14573

(51) Int. Cl.
| | |
|---|---|
| G06T 11/00 | (2006.01) |
| G06T 5/20 | (2006.01) |
| G06T 15/00 | (2011.01) |
| G06V 10/74 | (2022.01) |
| G06V 10/82 | (2022.01) |

(52) U.S. Cl.
CPC .............. *G06T 11/008* (2013.01); *G06T 5/20* (2013.01); *G06T 15/00* (2013.01); *G06V 10/761* (2022.01); *G06V 10/82* (2022.01); *G06T 2207/20081* (2013.01)

(58) Field of Classification Search
CPC ......... G06T 11/008; G06T 5/20; G06T 15/00; G06T 2207/20081; G06T 2211/441; G06V 10/761; G06V 10/82
See application file for complete search history.

(56) References Cited

U.S. PATENT DOCUMENTS

2021/0134054 A1    5/2021    Park et al.

FOREIGN PATENT DOCUMENTS

| EP | 3 819 874 A1 | 5/2021 | |
|---|---|---|---|
| KR | 10-2021-0117796 A | 9/2021 | |
| KR | 20210117796 A | * 9/2021 | ........... G06N 3/0464 |

OTHER PUBLICATIONS

Planche, Benjamin. Bridging the realism gap for cad-based visual recognition. Diss. Universität Passau, 2020. (Year: 2020).*

Matlock, Alex, and Lei Tian. "Physical model simulator-trained neural network for computational 3d phase imaging of multiple-scattering samples." arXiv preprint arXiv:2103.15795 (2021). (Year: 2021).*

(Continued)

*Primary Examiner* — Stephen R Koziol
*Assistant Examiner* — Dylan J Sherrillo
(74) *Attorney, Agent, or Firm* — Oblon, McClelland, Maier & Neustadt, L.L.P.

(57) ABSTRACT

A method is provided for correcting a reconstruction artefact of a three-dimensional tomographic image. The method includes the steps of providing an acquired three-dimensional tomographic image from a cell group, and applying the image to a neural network trained in advance to determine a corrected tomographic image.

13 Claims, 9 Drawing Sheets

(56) References Cited

OTHER PUBLICATIONS

French Preliminary Search Report issued Aug. 10, 2022, in French Application 21 14573, filed on Dec. 28, 2021 (with English Translation of Categories of cited documents and Written Opinion), 10 pages.

Planche, B., "Bridging the Realism Gap for CAD-Based Visual Recognition", Faculty of Computer Science and Mathematics (FIM) Chair of Distribution Information Systems, 2019 (172 pages).

\* cited by examiner

Fig. 4a
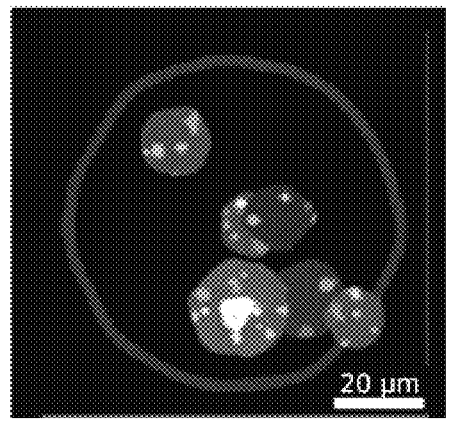
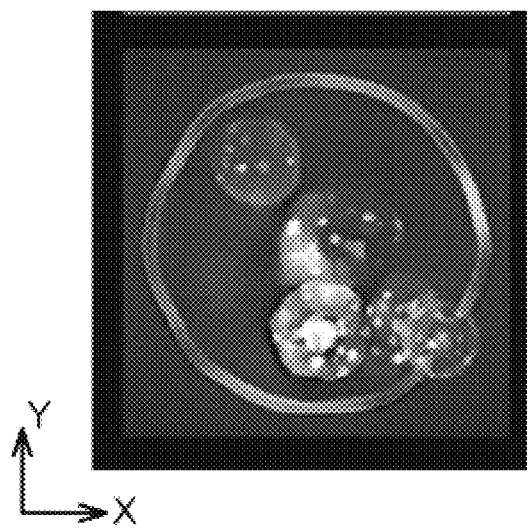
Fig. 4b

Fig. 5a
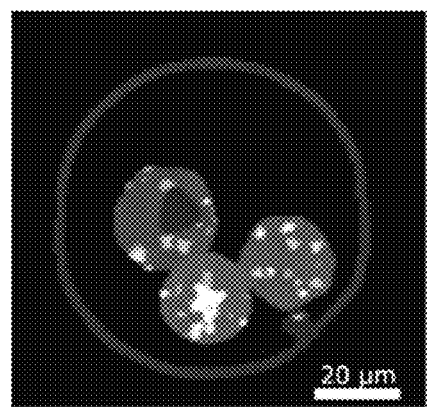
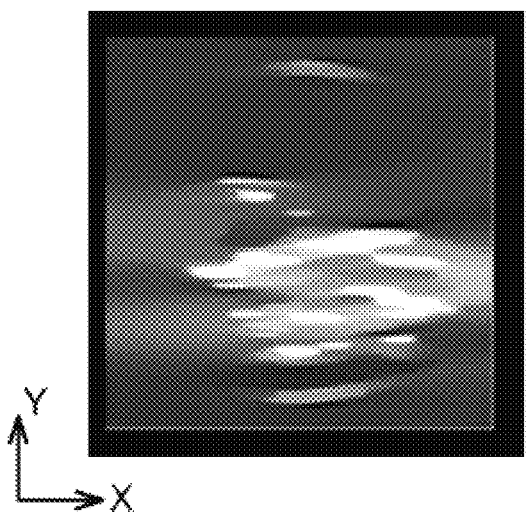
Fig. 5b

CORRECTION OF ARTIFACTS OF TOMOGRAPHIC RECONSTRUCTIONS BY NEURON NETWORKS

TECHNICAL FIELD AND STATE OF THE ART

The present invention relates to the field of 3D tomographic reconstruction from phaseless images. For this type of image, only the intensity of the light is acquired, as for a normal photograph. The technique comprises acquiring several images of the object studied for numerous different illumination angles. From these images and a light propagation model, an inverse problem is solved, the object of which is to find a 3D matrix of the optical index of the object that created the measured diffractions. In the context of a limited maximum illumination angle, for example if the maximum illumination angle does not exceed 20°, there is a high loss of information. This missing information is mainly characterized by a lengthening of the reconstructed images along the axis perpendicular to the plane of the sample. Furthermore, the fact of only acquiring the intensity of the light creates a second loss of information, since the phase of the image is lost. This missing information mainly results in the inaccuracy of the optical index measurements.

The present invention thus relates to a method for correcting 3D reconstruction artefacts using a trained neural network.

DISCLOSURE OF THE INVENTION

It is therefore an object of the present invention to provide a method for correcting a reconstruction artefact of a three-dimensional tomographic image acquired by a tomographic image acquisition device. The method comprises the steps of:
- providing an acquired three-dimensional tomographic image, said acquired three-dimensional tomographic image being reconstructed by a reconstruction algorithm from a plurality of elementary images acquired by said tomographic image acquisition device from a cell group,
- applying a trained neural network to said acquired three-dimensional tomographic image to correct the reconstruction artefact, and
- determining a corrected tomographic image.

Said neural network was trained in advance by the following steps:
- providing a simulated three-dimensional numerical model comprising at least a first volumetric object representing a first optical index,
- obtaining a simulated three-dimensional tomographic image reconstructed by the reconstruction algorithm from said simulated elementary images,
- comparing the simulated three-dimensional numerical model and the simulated three-dimensional tomographic image, and
- training the neural network to correct the reconstruction artefact corresponding to a difference between said simulated three-dimensional numerical model and said simulated three-dimensional tomographic image.

Advantageously, the simulated three-dimensional numerical model comprises a second volumetric object representing a second optical index different from the first optical index.

The surfaces of the first and second volumetric objects are deformed by a deformation noise.

Said simulated three-dimensional numerical model used for the training of the neural network may comprise a single third volumetric object that is hollow with an edge deformed by a deformation noise, the edge representing a third optical index, the first and the second volumetric object being placed inside the third hollow volumetric object.

Advantageously, an inside of at least the first volumetric object comprises a plurality of mini volumetric objects, each mini volumetric object of the plurality having a different optical index from the optical index of the first volumetric object, the surface of each mini volumetric object being deformed by a deformation noise.

By way of example, the deformation noise is a Perlin noise.

The optical indexes of the plurality of mini volumetric objects may have a first random variation around a first average value.

According to a variant, the three-dimensional numerical model comprises a plurality of volumetric objects in which the optical indexes of the plurality of volumetric objects have a second random variation around a second average value. Said second random variation may be less relative to the first random variation and/or the second average may be lower relative to the first average.

Furthermore, the three-dimensional tomographic image acquired from a cell group and the three-dimensional tomographic image simulated from the model may be provided in the form of slices in a plane X-Y parallel to an acquisition plane. In this case, the neural network may be a first neural network and be configured to provide a corrected slice from an input of a plurality of slices. It thus becomes possible to:
- provide said acquired three-dimensional tomographic image and said simulated three-dimensional tomographic image in the form of M slices in a plane X-Z,
- train a second neural network to provide a corrected slice in the plane X-Z,
- provide said acquired three-dimensional tomographic image and said simulated three-dimensional tomographic image in the form of M slices in a plane Y-Z,
- continue to train said second neural network to provide a corrected slice in the plane Y-Z,
- apply said second neural network to correct the acquired three-dimensional tomographic image provided in the plane X-Z to obtain a first transverse image,
- apply said second neural network to correct the acquired three-dimensional tomographic image provided in the plane Y-Z to obtain a second transverse image,
- create a filter based on the first and second transverse image,
- multiply the filter with the corrected tomographic image obtained by the application of the first neural network. The step of providing an acquired three-dimensional tomographic image may also comprise providing an initialization volume forming a base for the tomographic image to reconstruct, wherein the tomographic image corrected by the application of the neural network is used as initialization volume.

Advantageously, each elementary image is acquired with a different illumination angle, preferably a difference between two illumination angles being 40° or less.

BRIEF DESCRIPTION OF THE DRAWINGS

The present invention will be better understood on the basis of the following description and accompanying drawings in which:

FIG. 4*a*

FIG. 4*b*

FIG. 5*a*, and

FIG. 5*b* show a numerical model and a tomographic image,

DETAILED DISCLOSURE OF PARTICULAR EMBODIMENTS

In the following description a "three-dimensional tomographic image acquired from a cell group" or "acquired tomographic image" designates a three-dimensional image obtained from a method of acquiring elementary images using an device for imaging and processing elementary images.

By three-dimensional tomographic image (acquired from a cell group or simulated from a three-dimensional numerical model, see below) is meant a three-dimensional (3D) matrix which comprises as entry at each position a real number or an imaginary number or a complex number.

In the case of a complex number (n=a+i b) it is a complex optical index or refractive index. In the case of a real number it is the real part of the complex optical index (a) which gives the phase shift of a light. In the case of an imaginary number, it is the imaginary part of the complex optical index which is concerned with the absorption of the light.

The value of the entry (n or a or b) represents an "index jump" relative to the surrounding optical medium. In other words, the index jump constitutes the difference between the value of the optical index at that location in the object and the optical index of the medium in which the object is placed. For example, an index jump of 0.1 is considered if a ball of refractive index 1.43 is placed in water of which the refractive index is 1.33.

Thus, the three-dimensional tomographic image comprises as entry at each location the jump of the real part of the optical index or the jump of the imaginary part of the optical index or the jump of the complex optical index.

In general terms, the method described may be implemented using the real part (a), the imaginary part (b) or the complex number (n=a+i b) of the optical index.

A "three-dimensional tomographic image simulated from a three-dimensional numerical model" or "simulated tomographic image" is obtained from a numerical model by computer simulation. A simulator of the imaging device is used to determine the elementary intensity images from the numerical model. Next, the simulated elementary images are processed to obtain the simulated tomographic image. The same algorithm for processing the elementary images is used to obtain the acquired tomographic image or the simulated tomographic image. Said model is a three-dimensional matrix comprising as entry at each location the jump in the optical index as explained above. Thus, it may be the jump in the real part of the optical index or the jump in the imaginary part of the optical index or the jump in the complex optical index.

Figure 1:
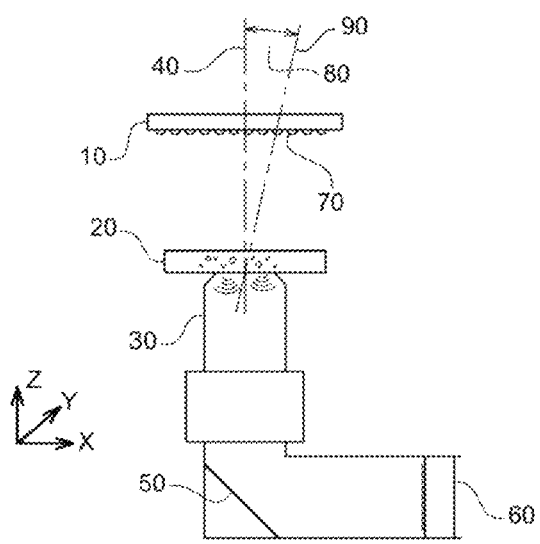
FIG. 1 shows a device for acquiring three-dimensional tomographic images from a cell group.

An "acquired elementary image" is an intensity image acquired in an acquisition plane (X-Y) by the imaging device, shown in FIG. 1.

A "simulated elementary image" is an intensity image simulated from the numerical model.

It corresponds to an elementary image that would be obtained if a physical sample, identical to the numerical model, were to be used with the imaging device.

A "slice of the acquired tomographic image" is an extract of a given thickness in a plane XY, XZ or YZ, obtained from the acquired tomographic image. A "slice of the simulated tomographic image" is an extract of a given thickness in a plane XY, XZ or YZ, obtained from the simulated tomographic image. In both cases (acquired or simulated), the slice thus comprises the jump in optical index (real part, imaginary part or complex number, see above).

A "cut from the model" is an extract from the model of a given thickness in the plane XY, XZ or YZ. The slice thus comprises the jump in optical index (real part, imaginary part or complex number, see above).

FIG. 1 shows an example of a device for acquiring a three-dimensional tomographic image from a cell group. A system of Cartesian coordinates is also shown and will be used in the later Figures.

FIG. 1 shows a cell group (20) of which a three-dimensional tomographic image is acquired. For example, the cell group may be a sample of tissue. The sample may comprise between 1 and 200 cells and have a size from 0 to 200 micrometers. FIG. 1 also shows a LED array (10) with one illuminated LED (70) and a direction of propagation (90) of light emitted by the illuminated LED (70). Also shown are an objective (30), a mirror (50) and a digital image sensor (60). The image sensor may be a CMOS sensor. In the example shown and in what follows, the acquisition plane is the plane X-Y.

To acquire a transmission elementary image with a given illumination angle (80), a particular LED (70) of the LED array (10) is illuminated while the other LEDs remain extinguished. The light of the illuminated LED (70) passes through the sample in a propagation direction (90) which has an illumination angle (80) relative to the sample. Said illumination angle depends on the position of the illuminated LED on the LED array. After having passed through the sample, the transmitted light is focused on the image sensor (60) by the objective (30).

To obtain a three-dimensional tomographic image it is necessary to acquire a plurality of elementary transmission images from the cell group, each elementary image being acquired with a different illumination angle. Thus, a first elementary image is acquired with only one first LED on the LED array (10) turned on while the other LEDs remain extinguished. A second elementary image is acquired with a second LED, different from the first turned on LED, while the other LEDs remain extinguished. The first and the second elementary image are thus acquired with different illumination angles, dependent on the position of the first and second LEDs on the LED array. Next, other elementary images are acquired using the other LEDs of the LED array.

Advantageously, a difference between two illumination angles (80) is 40° or less. In other words, a range of angles is 40° or less. By range of angles is meant the difference between the greatest illumination angle and the smallest illumination angle. In other words, the illumination angle (80) between a central axis perpendicular to the plane of the sample (20) and the propagation direction (90) of the light is equal to or smaller than 20° for all the elementary images acquired. In the device shown in FIG. 1 the range of angles which may be obtained is limited to a value below 180.

Alternatively, a spiral or helical tomography apparatus could be used. In that case, the light source and the image sensor have a fixed relative position and turn on a circle around the sample. This device enables a range of angles to be produced up to 360.

Alternatively, the three-dimensional tomographic image may be obtained by the device and method described in reference [1] or reference [2].

A three-dimensional tomographic image is next reconstructed from the elementary images (acquired tomographic image). The three-dimensional tomographic image is a cloud of points or, in other words, a three-dimensional array. As explained earlier, each point of the array comprises a value corresponding to the optical index of the sample at the same location. Said reconstruction method relies on an algebraic algorithm based on a matrix representation of the problem is described in detail in reference [1] or in reference [2]. At the start, the reconstruction algorithm is initialized by an initialization volume. The initialization volume forms a base for the acquired three-dimensional tomographic image that will be reconstructed. Usually, the initialization volume is a volume comprising no information. In other words, it is a volume having a refractive index or optical index that is constant and null.

For example, for development work, it is also possible to simulate a three-dimensional tomographic image from a three-dimensional numerical model. In this case, the numerical model replaces the sample. The numerical model is defined on a computer. The numerical model comprises a cloud of points, each point having a value representing a refractive index or an optical index.

A plurality of elementary transmission images is simulated from the numerical model. Each elementary simulated image corresponds to an acquisition made with a different illumination angle. Next, a three-dimensional tomographic image is reconstructed from simulated elementary images by the algebraic algorithm, see references [1] or [2]. The result will be called three-dimensional tomographic image simulated from the three-dimensional model or simulated tomographic image.

A comparison between the numerical model and the simulated tomographic image makes it possible to verify an operation of the reconstruction algebraic algorithm easily. Said difference also makes it possible to train a neural network to correct that difference, as will be described below. FIGS. 4a and 5b show a section in a plane X-Y or X-Z obtained directly from a three-dimensional numerical model. In the present case the real part of the optical index has been used. In general terms, the method described may be implemented using the real part, the imaginary part or the complex number of the optical index. The Figures thus make it possible to discern the form of the objects of which the tomographic image acquisition is simulated. FIGS. 4b and 5b show a slice of the simulated tomographic image that is located at the same position as the cut from the images 4a and 5a. The difference in form between FIGS. 4a and 4b or between FIGS. 5a and 5b enables said reconstruction algorithm to be evaluated. It can be seen that FIGS. 4a and 4b show very similar forms. FIGS. 5a and 5b are very similar to each other. The spheroidal forms of the model, shown in FIG. 5a, cannot be images with the techniques of acquisition and reconstruction implemented. High deformation in the X direction has taken place.

In general terms, said difference may be qualified as a reconstruction artefact. The difference between the numerical model and the simulated tomographic image may be caused by an imperfect reconstruction algorithm. It may also arise if the range of the illumination angle is limited to a value below 360. For example, a range of angles of 40° or of 20° causes a loss in information causing a reconstruction artefact.

Figure 2A:
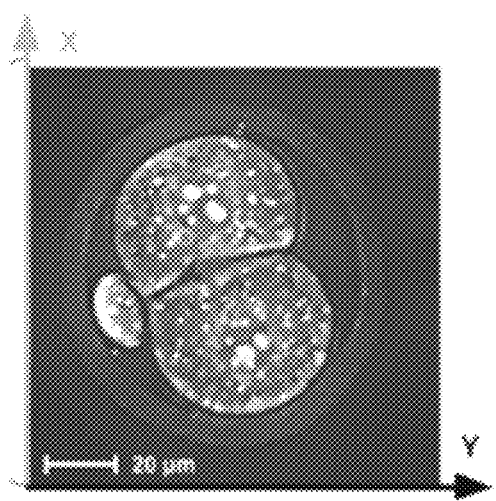
FIG. 2*a*.
Figure 2B:
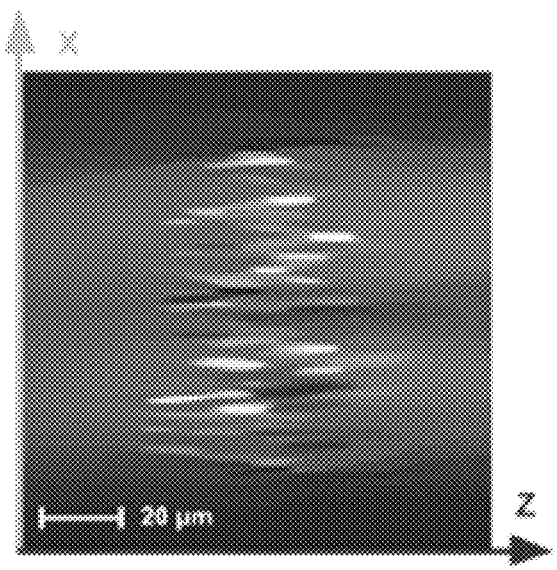
FIG. 2*b* show an acquired tomographic image.

FIG. 2a and FIG. 2b show the reconstruction artefact caused by an acquisition over a range of angles below 360°. In the case shown, an acquisition over a range of 40° has been made based on a cell group of fewer than 5 cells. The two Figures show the acquired tomographic image. FIG. 2a shows a slice in a plane X-Y, FIG. 2b shows a slice in a plane X-Y. It can be seen that FIG. 2a shows a clear form of cells of spheroidal form. The plane X-Y corresponds to the plane from which the greatest quantity of information has been obtained, see FIG. 1. The plane X-Z shows a longitudinal deformation of the spheroidal cells in the direction Z. The deformation is caused by a lack of information due to the limited range of angles.

The reconstruction artefact may be corrected by the application of a neural network which has been trained to recognize said artefact and to apply a correction to the acquired tomographic image. Thus, a method for correcting the reconstruction artefact of the three-dimensional tomographic image comprises the steps of:

providing an acquired three-dimensional tomographic image, the acquired three-dimensional tomographic image being reconstructed by the reconstruction algorithm from a plurality for elementary images acquired by the tomographic image acquiring device from a cell group, by way of example the cell group comprising preferably between 1 and 50 or fewer than 200 cells.

applying a trained neural network to said acquired three-dimensional tomographic image to correct the reconstruction artefact, to determine a corrected image. The neural network used was trained using a numerical model. As described previously, the use of such a model makes it possible to show the reconstruction artefact. A neural network may thus be trained to correct the reconstruction artefact by, during a training phase, providing it with a simulated tomographic image and said model itself. Thus, said neural network has been trained by the following steps:

providing a simulated three-dimensional numerical model (referred to as numerical model)

determining, from the numerical model, a plurality of simulated elementary images, obtaining a simulated three-dimensional tomographic image, reconstructed by the reconstruction algorithm from said simulated elementary images, and next, training the neural network to correct the reconstruction artefact corresponding to a difference between the numerical model and the simulated tomographic image.

The correction quality of the three-dimensional tomographic image acquired from a cell group depends on the numerical model used for training the neural network.

Figure 3A:
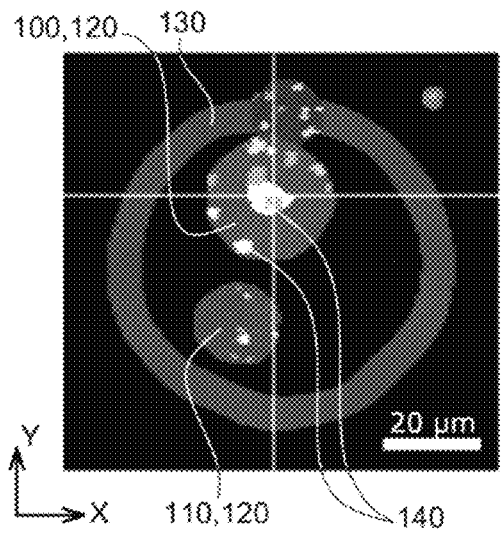
FIG. 3*a*.
Figure 3B:
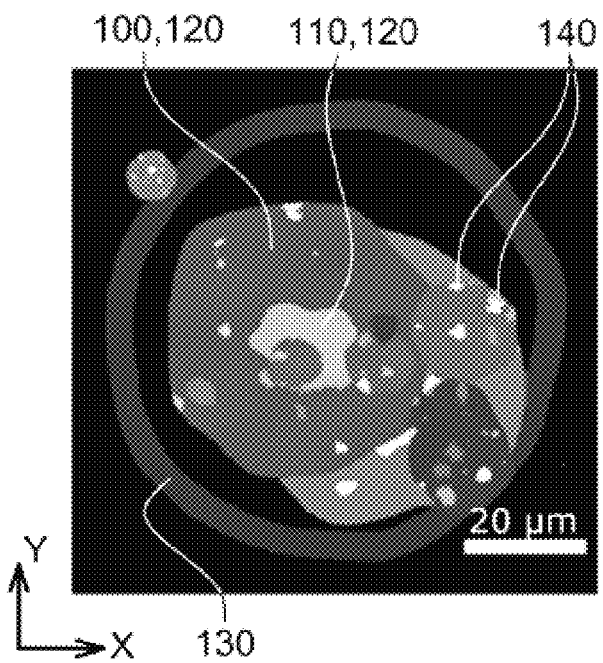
FIG. 3*b* show a numerical model.

FIGS. 3a and 3b show a numerical model used for training the neural network. FIGS. 3a and 3b show a cut from the model on the plane X-Y or X-Z.

A very good result may be obtained by using a numerical model comprising at least a first volumetric object (110)

representing a first optical index. The surface of the first volumetric object may be deformed by a deformation noise. By way of example, the deformation noise may be white noise, a Perlin noise or any other noise of the same type.

Advantageously, the numerical model further comprises a second volumetric object (120) representing a second optical index different from the first optical index, it also being possible for the surface of the second volumetric object to be deformed by a deformation noise, preferably a Perlin noise. The noise used may also be white noise. The use of a numerical model comprising first and second volumetric objects makes it possible to reduce the number of objects for training.

A volumetric object or a mini volumetric object (see below) may for example be a sphere. It may also be a cylinder, a cube, or another three-dimensional geometric object with a closed surface. A volumetric object usable for the numerical model may also be created by the following method:
  generating a three-dimensional map of deformation noise of Perlin noise type,
  defining a threshold, for example at a value of 0.3,
  associating all the points having a value below the threshold with a value of zero.

This results in obtaining a volumetric object usable for said numerical model. Such as model is particularly well-adapted for image acquisition of a cell group. Such a model adopts the relevant features found in a sample of cells but is still sufficiently generic to avoid overfitting the neuron model.

By way of example, the surface of the volumetric object may be deformed by a deformation noise of Perlin noise type in the following way: A three-dimensional Perlin noise field is generated in which each point of the space has a positive or negative noise value. Next, points on the surface of the volumetric object are sampled, and each point is radially offset towards the volumetric object or away according to the noise value at that location. It is also possible to use another noise in place of the Perlin noise, for example white noise.

It is also possible to use a plurality of volumetric objects (120), the plurality of volumetric objects for example comprising between 10 and 20 volumetric objects, more than 10 volumetric objects or fewer than 20 volumetric objects. In this case, it is also possible to provide one or more volumetric objects placed on the edge of the hollow third volumetric object (see below), but a majority of the plurality of volumetric objects is placed inside the hollow third volumetric object. An intensity of the Perlin noise or of another noise used, such as a white noise, may vary. The variations may be comprised between 30% and +30% of an extension of the volumetric object. A size of the volumetric objects may be comprised between 80 and 90 micrometers.

Advantageously, the model may comprise a single hollow third volumetric object (130) with an edge deformed by a Perlin noise or by another noise used alternatively.

The edge is defined by the noise, preferably by the Perlin noise, as follows:
  a three-dimensional noise field is generated in which each point of the space has a positive or negative noise value,
  next, points on the surface of the volumetric object are sampled, and each point is radially offset towards the volumetric object or away according to the noise value at that location.

The edge has a third optical index, which is advantageously different from the optical index of the volumetric objects. The first and the second volumetric object or the plurality of volumetric objects is placed inside the hollow third volumetric object.

The model may advantageously be further improved by placing a plurality of mini volumetric objects (140) inside each volumetric object. A plurality of mini volumetric objects may comprise more than 70 and/or less than 160 mini volumetric objects. Thus, the first volumetric object and the second volumetric object or each volumetric object of the plurality of volumetric objects may comprise several mini volumetric objects or a plurality of mini volumetric objects. In other words, the first volumetric object comprises a first plurality of mini volumetric objects, the second sphere comprises a second plurality of mini volumetric objects, and so forth. Each mini volumetric object has a different optical index from the optical index of the volumetric object in which said mini volumetric object is placed. For example, concerning the first volumetric object, each mini volumetric object of the first plurality of mini volumetric objects has a different optical index from the optical index of the first volumetric object.

The surface of each mini volumetric object is deformed by a noise, preferably a Perlin noise, as follows: a three-dimensional noise field is generated in which each point of the space has a positive or negative noise value. Next, points on the surface of the volumetric object are sampled, and each point is radially offset towards the volumetric object or away according to the noise value at that location.

Advantageously, the optical indexes within each plurality of mini volumetric objects has a first random variation around a first average value. For example, an average value may be 0.01 and a variation may be 0.005. A size of the mini volumetric objects may be comprised between 0.2 and 25 micrometers.

Thus, the optical indexes of the plurality of volumetric objects may have a random variation around an average value. To differentiate, this random variation and this average value will be designated second random variation and second average value. The optical indexes of the mini volumetric objects within a plurality of mini volumetric objects may have a first random variation around a first average value.

Advantageously, the second random variation is less relative to the first random variation and/or in which the second average is lower relative to the first average.

Alternatively, the following method may be employed:

A random number is determined between 10 and 20. This number will determine the number of volumetric objects, representing cells, that will be generated. Each volumetric object will be deformed with noise, preferably with Perlin noise. Next, each volumetric object is filled with a constant optical index of random value between 0.01 and 0.02. Inside each volumetric object a random number of mini volumetric objects (representing nuclei) are added, comprised between 70 and 160. Each mini volumetric object is deformed with noise, preferably Perlin noise, and then filled with a constant optical index comprised between 0.005 and 0.015.

To train the neural network to correct the artefact of the acquired tomographic image, a model composed of 1024×1024×1024 voxel may be used. Each voxel may have a size of 0.126 micrometers*0.126 micrometers*0.126 micrometers. FIGS. 4a and 5a show a cut in a plane X-Y and X-Z obtained from said model.

Advantageously, from said model, the acquisition of 84 elementary images is simulated (elementary images not shown), at 84 different angles. A simulator of the tomographic acquisition device (for example a tomographic microscope simulator) is used.

From these elementary images, the simulated tomographic image is reconstructed to obtain a volume with 128 layers with 1024*1024*128 voxel, each voxel having a size of 0.126 micrometers*0.126 micrometers*1 micrometers. Said numerical model of 1024×1024×1024 voxel is interpolated to the size 1024*1024*128 voxel to ensure direct comparability with the simulated tomographic image, obtained from said model.

The neural network may then be trained on the comparison and correction of the simulated tomographic image and the numerical model itself. In this case, the three-dimensional (3D) neural network is used.

Alternatively, the neural network may be trained on the comparison of (2D) two-dimensional extracts. In this case, a two-dimensional neural network is used. The extracts are obtained from the numerical model or from the simulated tomographic image.

FIGS. 4b and 5b show a slice obtained from the simulated tomographic image, located at the same location as the cuts of images 4a and 5a, obtained directly from the numerical model. In the present case the real part of the optical index has been used. In general terms, the method described may be implemented using the real part, the imaginary part or the complex number of the optical index. The neural network will thus be trained to correct, for example, a difference between the images of FIGS. 4a and 4b and/or a difference between the images of FIGS. 5a and 5b.

For example, 66 numerical models may be generated. From the numerical model, 128 cuts are obtained directly. From the simulated tomographic image, 128 slices are obtained. Each cut may be obtained in a plane X-Y. As a result, the network may be trained on the comparison of 8448 cuts in this exemplary case.

The simulation of the acquisition of the three-dimensional tomographic image from the model comprises the simulation of the elementary images. For example, 84 angles may be used. With each elementary image an illumination angle (80) is associated.

Advantageously, the neural network is trained using the same illumination angles as will be used during a later acquisition performed on a cell group. Thus, the neural network may be particularly well-adapted to a number of elementary images acquired with a distribution of illumination angles.

The neural network used may advantageously be a U-net as described in reference [3]. A U-net neuronal network may be a three-dimensional or two-dimensional network.

Advantageously, a two-dimensional U-net and training by 2D extracts is used. In this case, the three-dimensional tomographic image acquired from a cell group and the three-dimensional tomographic image simulated from the model are provided in the form of slices in a plane X-Y parallel to an acquisition plane as shown in FIG. 1. The neural network is configured to provide a corrected slice based on a plurality of input slices, as will be detailed below.

Figure 6:
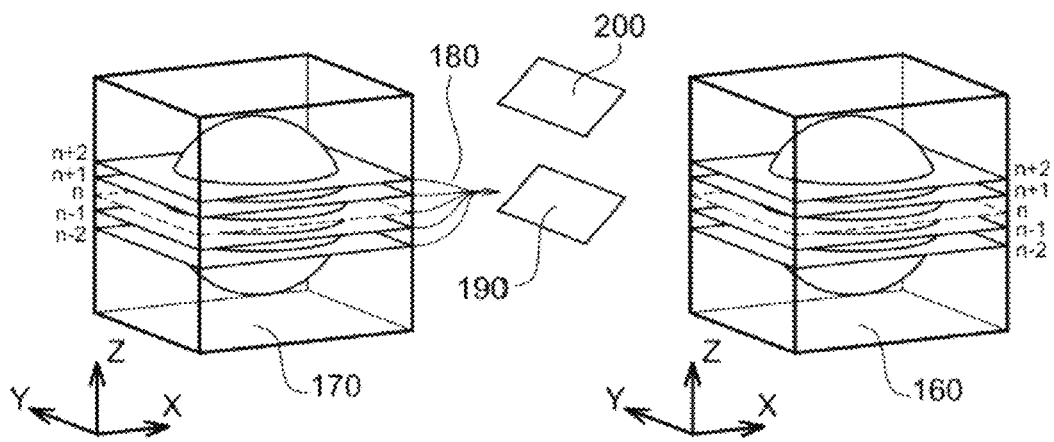
FIG. 6 shows training of a neural network.

FIG. 6 shows an abstraction of the simulated tomographic image (170). In the present case the real part of the optical index has been used. In general terms, the method described may be implemented using the real part, the imaginary part or the complex number of the optical index. Said image is provided in the form of slices in a plane X-Y parallel to the acquisition plane of the acquisition device, shown in FIG. 1. The neural network (180) is configured to take several two-dimensional slices as input and to output a single corrected slice. In the example shown the network takes five slices (slice number: n−2, n−1, n, n+1, n+2) as input and determines one output slice (190). The position of the output slice is associated with the mid-position of the input slices, in other words at slice number n. Alternatively, it is also possible to provide seven slices. As slice number, it is also possible to provide: [n−4, n−2, n, n+2, n+4] or [n−8, n−4, n−2, n, n+2, n+4, n+8].

It is also advantageous to provide a randomly chosen extract of each slice to the neural network. In other words only part of the slice is shown to the neural network. Showing a random extract makes it possible never to show the same pair of input and output images to the network twice during the training and thus to greatly limit the problems of overfitting.

Next, a cut from the same position n (200) is output directly from the numerical model. If a random extract of the slice is used, an extract located at the same position is used for the cut from the model. FIG. 6 shows an abstraction of the numerical model (160). The cuts from the numerical model are provided in a plane X-Y parallel to the acquisition plane of the acquisition device, shown in FIG. 1. Said cut n is indicated in the numerical model. To train the neural network, a plurality of slices (190) corrected by the neural network is determined. A plurality of cuts with the same position (200) is determined from the numerical model.

The set of these training images will be denoted $\Omega$. The weight of the neural network will be denoted W. According to the example the network f_W (180) takes five layers as input, named I_In, and yields on image I_out (190) to compare with the reference or central image (n), named I_s (200). The training of the neural network amounts to finding the weight W that minimizes the following cost function:

$$\text{cost} = \sum_{\Omega_{I_{In}}} |f_W(I_{In}) - I_s|^2$$

This optimization may be made using the algorithm detailed in reference [4].

Figure 7:
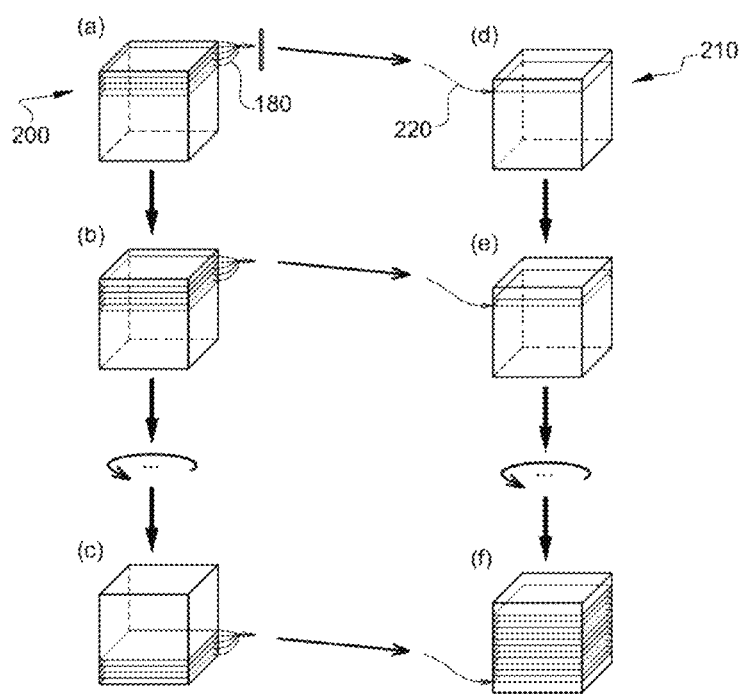
FIG. 7 shows correction of an acquired tomographic image.

FIG. 7 shows the application of the trained neural network to determine the corrected image. In the case shown, the correction is made by image slice, by a trained neural network such as shown and described in FIG. 6.

This neural network is particularly well-adapted to correct the three-dimensional tomographic image acquired from a cell group. Said acquired tomographic image is provided in the form of slices in the plane X-Y which is parallel to the acquisition plane of the elementary images. The acquisition plane of the acquisition device is shown in FIG. 1. FIG. 7 shows the acquired tomographic image before correction (200) and after correction (210). The tomographic image acquired before correction (200) is provided in the form of slices in the plane X-Y. A first plurality of slices is indicated in Figure (a). The trained neural network (180) takes this first plurality of slices as input and determines a corrected slice (220). The corrected slice forms part of the corrected tomographic image (210).

Figure 8A:
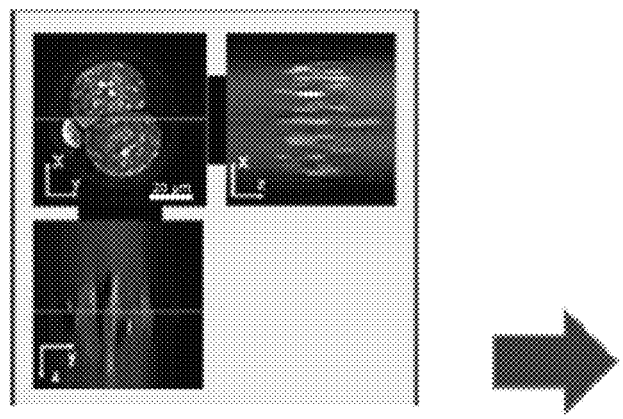
FIG. 8*a*.
Figure 8B:
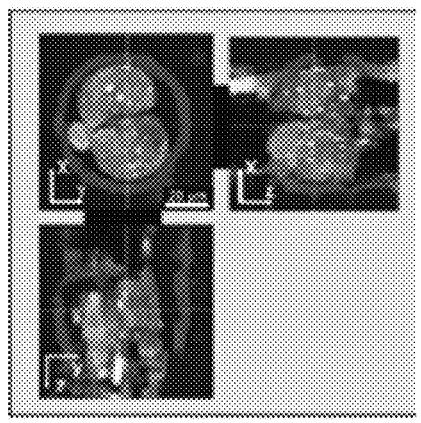
FIG. 8*b* show an example of a corrected tomographic image.

All the slices of the image are corrected by applying the neural network (Figures (b), (c)), which takes as input the plurality of slices to provide a corrected slice (Figures (e), (f)), corresponding to a mid-position among the slices provided. In other words, for three-dimensional tomography provided, for example, in the form of 100 slices and a neural network taking 5 slices as input, slice 3 will be corrected based on slices 1 to 5. Next, slice 4 will be corrected based on slices 2 to 6 and so forth. At the end, slice 98 will be corrected based on slices 96 to 100. Slices 1, 2, 99 and 100 will not be corrected and removed. FIGS. 8a and 8b show a result of correction. FIG. 8a shows a tomographic image acquired before correction. A slice located in the plane X-Y, X-Z and Y-Z is shown. The orientation of the coordinate system relative to the acquisition device is shown in FIG. 1.

High deformation of the images in the plane X-Z and Y-Z will be noted.

FIG. 8b shows the same tomographic image after correction. The same cuts as in FIG. 8a are shown. It is noted that the deformations in the plane X-Z and Y-Z have been corrected and a spheroidal form of the cells becomes visible.

The correction of the tomographic image may be still further improved by the application of a filter. The development of the filter will be explained below in conjunction with FIGS. 9a-9d.

The acquired tomographic image and the simulated tomographic image will be provided in the form of M slices in a plane X-Z and M slices in a plane Y-Z. A second neural network is next trained to provide a corrected slice in the plane X-Z and Y-Z based on an input slice.

Figure 9A:
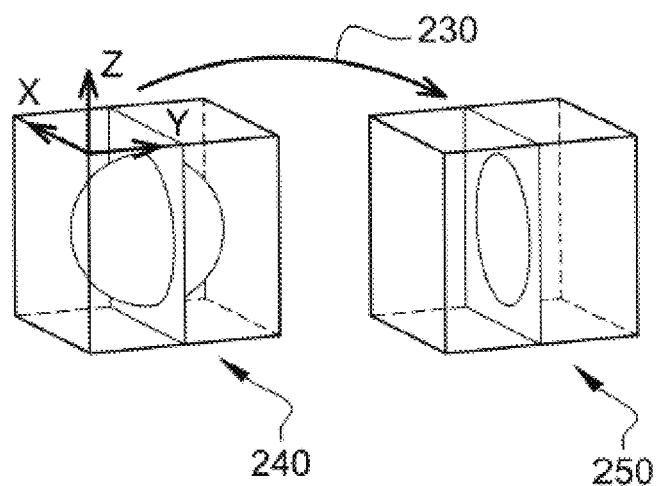
FIG. 9*a*
Figure 9B:
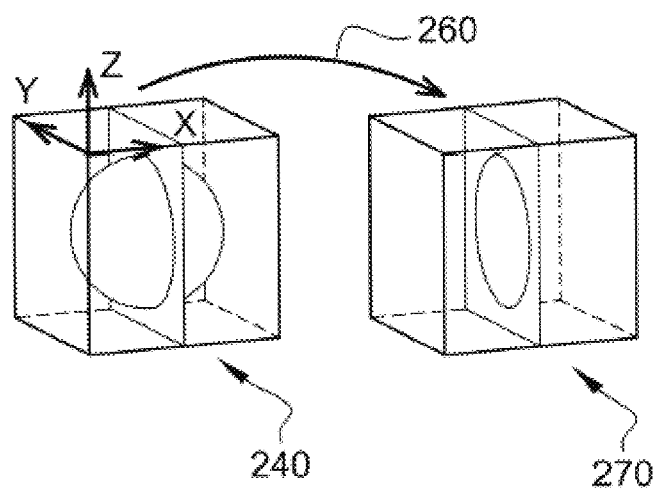
FIG. 9*b*

The second trained neural network (230) is next applied to all the slices X-Z and all the slices Y-Z of the acquired tomographic image. As a result there is obtained a first transverse image (250) and a second transverse image (270) or in other words, a three-dimensional tomographic image corrected according to the slices in X-Z or Y-Z by the second neural network (FIGS. 9a and 9b). In other words, the three-dimensional tomographic image acquired from a cell group and the three-dimensional tomographic image simulated from the model are provided in the form of M slices in a plane X-Z. The second neural network is trained to be able to provide a corrected slice in the plane X-Z. Next, the three-dimensional tomographic image acquired from a cell group and the three-dimensional tomographic image simulated from the model are provided once again, this time in the form of M slices in a plane Y-Z.

The training of said second neural network is now continued: It will be trained to provide a corrected slice in the plane Y-Z.

Figure 9C:
FIG. 9*c*.

Said second neural network thus trained is now used to correct the three-dimensional tomographic image acquired from a cell group provided in the plane X-Z to obtain a first transverse image as a result. Next, said second neural network is once again applied, this time to correct the three-dimensional tomographic image acquired from a cell group provided in the plane Y-Z to obtain a second transverse image. Said filter is created from the first (250) and the second (270) transverse image. The first and the second transverse images are multiplied. Next, Gaussian blur is applied to the 3D volume. Based on this blurred volume, normalization is carried out, in which the "high intensity" voxels receive the value 1 and the weaker ones the value 0. The "high intensity" pixels are pixels that have a value greater than a threshold. This threshold may for example have the value 0.005. In other words, the filter is created from the first and second transverse image. The filter is shown in FIG. 9c. FIG. 9c shows a three-dimensional mask. A white point corresponds to a multiplication factor of 1, a black point to a multiplication factor of 0.

A filter is next applied to the acquired tomographic image after correction, shown in FIG. 8b or in other words, an image corrected by a neural network in the plane X-Y.

Figure 9D:
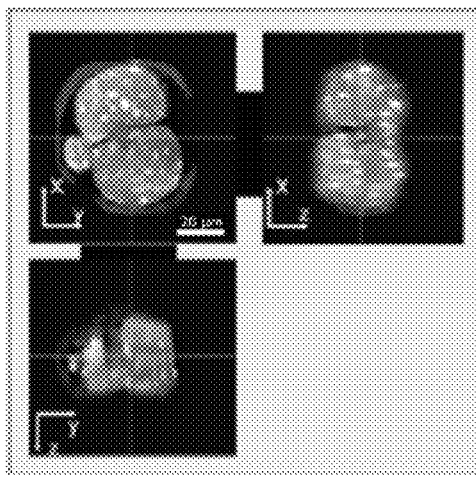
FIG. 9*d* show a filter.

FIG. 9d shows the result of the application of the filter. By comparing FIG. 9d and FIG. 8b it is noted that the application of the filter makes the definition of the cells on the image clearer and thus improves its quality.

The correction method may be still further improved by modifying the reconstruction of the tomographic image from the elementary images. As described earlier, the reconstruction algorithm is initialized by an initialization volume forming a base for a volume to reconstruct. Advantageously, said initialization volume may be provided in the form of an acquired tomographic image already corrected by the application of a neural network. For example, the image as described in conjunction with FIG. 8b may be used as initialization volume.

REFERENCES CITED

[1] Shwetadwip C et al, Optica Vol. 6, No. 9, September 2019, pages 1211-1219.
[2] Ulugbek S K et al, Optica Vol. 2, No. 6, June 2015, pages 517-522.
[3] Ronneberger, O., Fischer, P., & Brox, T. (2015). U-Net: Convolutional Networks for Biomedical Image Segmentation. In Lecture Notes in Computer Science (pp. 234-241). Springer International Publishing. https://doi.org/10.1007/978-3-319-24574-4_28.
[4] Kingma, D. P. & Ba, J. (2014). Adam: A Method for Stochastic Optimization (cite arxiv:1412.6980. Published as a conference paper at the 3rd International Conference for Learning Representations, San Diego, 2015).

The invention claimed is:

1. A method for correcting a reconstruction artefact of a three-dimensional (3D) tomographic image acquired by a tomographic image acquisition device, the method comprising:
    providing the acquired 3D tomographic image, said acquired 3D tomographic image being reconstructed by a reconstruction algorithm from a plurality of elementary images acquired by said tomographic image acquisition device from a cell group,
    applying the acquired 3D tomographic image to a trained neural network to correct the reconstruction artefact, and
    determining a corrected tomographic image,
    wherein said neural network was previously trained by:
        determining a simulated 3D numerical model comprising at least a first volumetric object representing a first optical index,
        determining, from the simulated 3D numerical model, a plurality of simulated elementary images,
        obtaining a simulated 3D tomographic image reconstructed by the reconstruction algorithm, from said plurality of simulated elementary images, the simulated 3D tomographic image and the simulated 3D numerical model each comprising a 3D matrix of voxel values,
        comparing the simulated 3D numerical model and the simulated 3D tomographic image to determine a difference between said simulated 3D numerical model and said simulated 3D tomographic image, and
        training the neural network to correct the reconstruction artefact corresponding based on the determined difference between said simulated 3D numerical model and said simulated 3D tomographic image.

2. The method according to claim 1, wherein the simulated 3D numerical model further comprises a second volumetric object representing a second optical index different from the first optical index, surfaces of the first and second volumetric objects being deformed by a deformation noise.

3. The method according to claim 2, wherein the simulated 3D numerical model comprises a single third volumetric object that is hollow with an edge deformed by the deformation noise, the edge representing a third optical index, the first and second volumetric objects being placed inside the third hollow volumetric object.

4. The method according to claim 1, wherein an inside of at least the first volumetric object comprises a plurality of mini volumetric objects, each mini volumetric object of said plurality having a different optical index from the optical index of the first volumetric object, a surface of each mini volumetric object being deformed by the deformation noise.

5. The method according to claim 2, wherein, the deformation noise is a Perlin noise.

6. The method according to claim 4, wherein the optical indexes of the plurality of mini volumetric objects have a first random variation around a first average value.

7. The method according to claim 6, wherein the 3D numerical model comprises a plurality of volumetric objects in which respective optical indexes of the plurality of volumetric objects have a second random variation around a second average value.

8. The method according to claim 7, wherein the second random variation is less than the first random variation and/or the second average is lower than the first average.

9. The method according to claim 1, wherein said acquired 3D tomographic image and said simulated 3D tomographic image are provided in a form of slices in an X-Z plane parallel to an acquisition plane, and wherein the neural network is a first neural network configured to provide a corrected slice from an input of a plurality of slices.

10. The method according to claim 9, further comprising:
providing said acquired 3D tomographic image and said simulated 3D tomographic image in the form of M slices in the X-Z plane,
training a second neural network to provide a corrected slice in the X-Z plane,
providing said acquired 3D tomographic image and said simulated 3D tomographic image in a form of M slices in a Y-Z plane,
continuing to train said second neural network to provide a corrected slice in the Y-Z plane,
applying said second neural network to correct the acquired 3D tomographic image provided in the X-Z plane to obtain a first transverse image,
applying said second neural network to correct the acquired 3D tomographic image provided in the Y-Z plane to obtain a second transverse image,
creating a filter based on the first and second transverse images, and
multiplying the filter with the corrected tomographic image obtained by the application of the first neural network.

11. The method according to claim 1, wherein the step of providing an acquired 3D tomographic image further comprises providing an initialization volume forming a base for the tomographic image to reconstruct, wherein the tomographic image corrected by the application of the neural network is used as an initialization volume.

12. The method according to claim 1, wherein each of the plurality of elementary images is acquired with a different illumination angle, a difference between two illumination angles being 40° or less.

13. The method of claim 1, wherein the simulated 3D tomographic image and the simulated 3D numerical model have a same number of voxels.

* * * * *